(12) United States Patent
Annaka (10) Patent No.: US 9,900,840 B2
(45) Date of Patent: Feb. 20, 2018

(54) COMMUNICATION DEVICE AND COMMUNICATION SYSTEM

(71) Applicant: Hidekuni Annaka, Saitama (JP)

(72) Inventor: Hidekuni Annaka, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 51 days.

(21) Appl. No.: 14/896,257

(22) PCT Filed: Jul. 31, 2014

(86) PCT No.: PCT/JP2014/070804
§ 371 (c)(1),
(2) Date: Dec. 4, 2015

(87) PCT Pub. No.: WO2015/016391
PCT Pub. Date: Feb. 5, 2015

(65) Prior Publication Data
US 2016/0142978 A1 May 19, 2016

(30) Foreign Application Priority Data

Aug. 2, 2013 (JP) .................................. 2013-161342
Jul. 23, 2014 (JP) .................................. 2014-149590

(51) Int. Cl.
*H04W 52/02* (2009.01)
*G06F 1/32* (2006.01)
(Continued)

(52) U.S. Cl.
CPC .......... *H04W 52/0251* (2013.01); *G06F 1/32* (2013.01); *H04L 67/327* (2013.01);
(Continued)

(58) Field of Classification Search
CPC .......................... H04W 52/0251; H04L 67/327
See application file for complete search history.

(56) References Cited

U.S. PATENT DOCUMENTS 6,282,674 B1 * 8/2001 Patel .................... G06F 11/267
714/30
6,289,402 B1 * 9/2001 Davis .................. G06F 13/4226
710/105
(Continued)

FOREIGN PATENT DOCUMENTS

JP H11-161381 6/1999
JP 2000-261515 9/2000
(Continued)

OTHER PUBLICATIONS

International Search Report dated Nov. 4, 2014 in PCT/JP2014/070804 filed on Jul. 31, 2014.
(Continued)

*Primary Examiner* — Jamal Javaid
(74) *Attorney, Agent, or Firm* — Oblon, McClelland, Maier & Neustadt, L.L.P.

(57) ABSTRACT

A communication device includes a reception unit configured to receive information from an external device; a control unit configured to implement control for storing, in a storage unit, state information relevant to a state of the communication device itself; a first processor configured to perform a process on the information received from the external device; and a second processor configured to perform a process of executing output. When the information received from the external device is a browse request to browse the state information, the first processor acquires requested information from the state information stored in the storage unit, and executes control to send the acquired information to the external device.

7 Claims, 7 Drawing Sheets

(51) Int. Cl.
H04N 1/00 (2006.01)
H04N 1/32 (2006.01)
H04L 29/08 (2006.01)

(52) U.S. Cl.
CPC ..... H04N 1/00344 (2013.01); H04N 1/00896 (2013.01); H04N 1/32593 (2013.01); *Y02B 60/50* (2013.01)

(56) References Cited

U.S. PATENT DOCUMENTS

| | | | |
|---|---|---|---|
| 2006/0095718 A1* | 5/2006 | Day | G06F 9/544 |
| | | | 712/34 |
| 2008/0049250 A1 | 2/2008 | Sugishita | |
| 2009/0171978 A1 | 7/2009 | Naono et al. | |
| 2010/0202018 A1 | 8/2010 | Akiyama et al. | |
| 2013/0116800 A1 | 5/2013 | Mizunashi | |

FOREIGN PATENT DOCUMENTS

| | | |
|---|---|---|
| JP | 2007-251433 | 9/2007 |
| JP | 2009-266088 | 11/2009 |
| JP | 2011-035798 | 2/2011 |
| JP | 2013-097734 | 5/2013 |

OTHER PUBLICATIONS

Extended European Search Report dated Jul. 19, 2016 in Patent Application No. 14831629.2.
Written Opinion dated May 8, 2017 in Singaporean Patent Application No. 11201510005W.

* cited by examiner

| SETTING INFORMATION OF USB SYSTEM | SETTING INFORMATION OF NETWORK SYSTEM | SETTING INFORMATION OF NETWORK APPLICATION SYSTEM | ... |
|---|---|---|---|
| PAGE A | PAGE B | PAGE C | ... |
| ⋮ | ⋮ | ⋮ | ... |

COMMUNICATION DEVICE AND COMMUNICATION SYSTEM

TECHNICAL FIELD

The present invention relates to a communication system.

BACKGROUND ART

There is known a projection type image display device, such as a projector, provided with a network function. There is known a technology of a projection type image display device, which is provided with three CPUs, namely, a network CPU for executing control relevant to the network, a main CPU for executing control relevant to the display of images, and a sub CPU. When images are not being projected, i.e., in a standby state, the power of the network CPU and the main CPU is turned off, and only the power of the sub CPU is turned on, which has lower power consumption than the network CPU and the main CPU. Accordingly, the power consumption in the standby state is reduced.

There is known a technology of a projector provided with a network function, in which a network microcomputer implements the control of the power of the main microcomputer, when shifting to a standby state and recovering from a standby state (see, for example, Patent Document 1). By controlling the power of the main microcomputer by the network microcomputer, the system configuration is simplified, and the power consumption in the standby state is suppressed.

When the network function is used in the standby state, the network function needs to be turned on. Therefore, the power consumption increases.

Patent Document 1: Japanese Laid-Open Patent Application No. 2011-035798

DISCLOSURE OF INVENTION

The present invention has been made in view of the above-described problems, and it is an object of at least one embodiment of the present invention to provide a communication device and a communication system, by which the power consumption is reduced when a network function is used in a standby state.

An aspect of the present invention provides a communication device including a reception unit configured to receive information from an external device; a control unit configured to implement control for storing, in a storage unit, state information relevant to a state of the communication device itself; a first processor configured to perform a process on the information received from the external device; and a second processor configured to perform a process of executing output, wherein when the information received from the external device is a browse request to browse the state information, the first processor acquires requested information from the state information stored in the storage unit, and executes control to send the acquired information to the external device.

An aspect of the present invention provides a system including an external device; and a communication device, wherein the external device sends information including a browse request to browse state information of the communication device, and the communication device includes a reception unit configured to receive the information from the external device; a control unit configured to implement control for storing, in a storage unit, the state information relevant to a state of the communication device itself; a first processor configured to perform a process on the information received from the external device; and a second processor configured to perform a process of executing output, wherein when the information received from the external device is the browse request to browse the state information, the first processor acquires requested information from the state information stored in the storage unit, and executes control to send the acquired information to the external device.

An aspect of the present invention provides a non-transitory computer-readable recording medium storing a program that causes a computer to execute a process performed by a communication device including a first processor for processing information received from an external device and a second processor for executing output, the process including receiving the information from the external device; and executing control by the first processor, to acquire requested information requested by the external device, from state information stored in a storage unit storing the state information relevant to a state of the communication device, and to send the acquired information to the external device, when the information received from the external device is a browse request to browse the state information.

DESCRIPTION OF THE REFERENCE NUMBERS 100 network terminal
102 CPU
104 display device
106 UI
108 storage unit
110 LAN
112 WLAN
200 network device
202 network board
204 communication processor
205 storage unit
206 image processor
208 LAN
210 WLAN
212 USB
214 main board
216 engine control processor
218 projection device
220 UI
222 image input
400 smartphone 500 projection device
600 MFP
700 printer
800 TV conference device
900 network
1000 TV conference device
1100 server device

BEST MODE FOR CARRYING OUT THE
INVENTION

Embodiments of the present invention are described below with reference to the accompanying drawings. The embodiments described below are merely examples; the embodiments to which the present invention is applied are not limited to the following embodiments.

Note that in all of the drawings used for describing the embodiments, elements having the same function are dented by the same reference numerals, and redundant descriptions are omitted.

Embodiment

Device Monitor System

Figure 1:
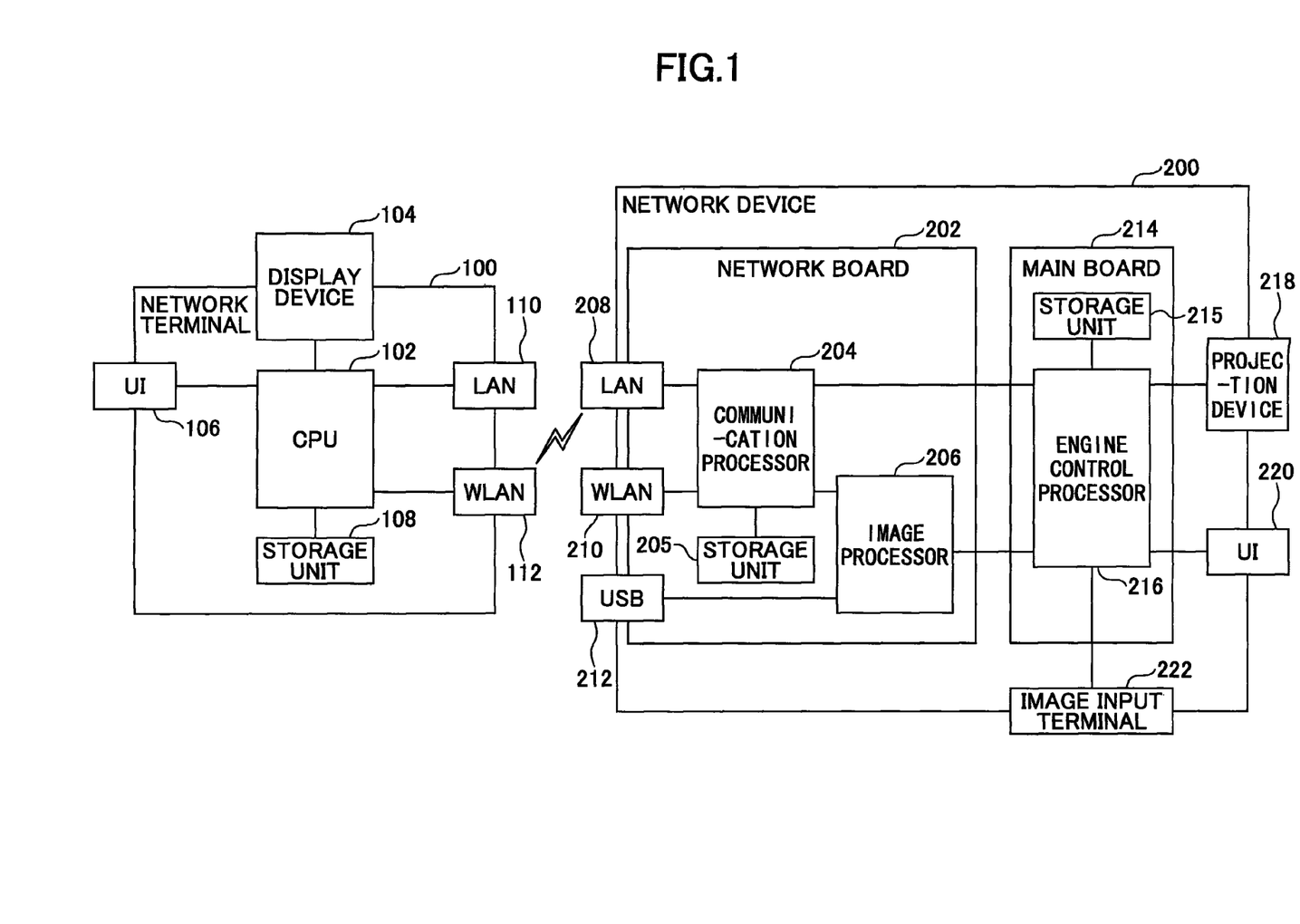
FIG. 1 illustrates an embodiment of a communication system.

FIG. 1 illustrates an embodiment of a device monitor system as a communication system.

The device monitor system includes a network terminal 100 as an external device, and a network device 200 as a communication device.

The network terminal 100 is a terminal having a network communication function, such as a PC, a mobile terminal, and an information terminal. The network device 200 is an output device such as a projector (PJ) having a network communication function, a multifunction peripheral (MFP), and a laser printer (LP). A description is given of the device monitor system according to one embodiment, in which the network device 200 is a projector.

From a web browser activated in the network terminal 100, it is possible to browse setting information of the network device 200 and state information such as the job history, and change the setting information.

Network Terminal 100

The network terminal 100 includes a CPU 102, a display device 104, a UI (User Interface) 106, a storage unit 108, a LAN 110, and a WLAN 112.

The CPU 102 inputs, to the display device 104, state information of the network device 200 (hereinafter, "first information"), according to an instruction that is input as the user operates the UI 106. The CPU 102 controls the LAN 110 and the WLAN 112 according to an instruction input as the user operates the UI 106, to perform communication with the network device 200.

The display device 104 displays data input from the CPU 102. For example, the display device 104 displays a page output from the network device 200.

The UI 106 is an interface for a user operating the network terminal 100. By operating the UI 106, the user can input data, execute a job, display images, and change settings.

The storage unit 108 stores various programs. Furthermore, the storage unit 108 is used when the CPU 102 performs data processing.

The LAN 110 is a LAN card that connects the communication between the network terminal 100 and the network device 200 by a wired line. The LAN 110 transmits/receives information according to the specification of the LAN system, such as Ethernet (registered trademark) (Ethernet/Fast Ethernet/Gigabit Ethernet).

The WLAN 112 transmits/receives data in a wireless manner, in compliance with a specification of wireless LAN such as IEEE 802.11.

Functions of Network Terminal 100

Figure 2:
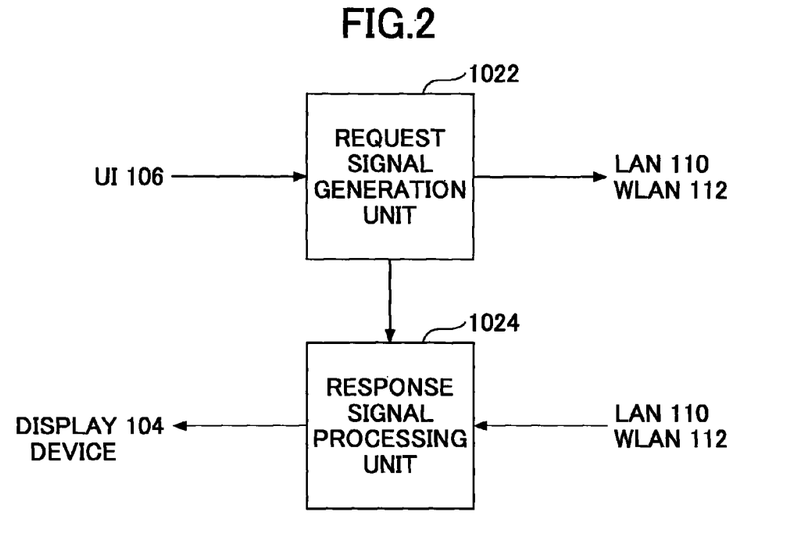
FIG. 2 illustrates an embodiment of a network terminal.

FIG. 2 illustrates functions of the network terminal 100.

The functions illustrated in FIG. 2 are mainly executed by the CPU 102. By operating according to programs (firmware) stored inside the CPU. 102 or programs stored in the storage unit 108, functions of a request signal generation unit 1022 and a response signal processing unit 1024 are executed.

The request signal generation unit 1022 is connected to the UI 106, the LAN 110, and the WLAN 112. The request signal generation unit 1022 generates a signal (hereinafter, "first request signal") requesting first information of the network device 200, when an operation signal requesting first information of the network device 200 is input from the UI 106.

The request signal generation unit 1022 generates a first request signal for acquiring page information and logic information, when requesting the first information of the network device 200 for the first time. The page information is information for displaying a page, which is the source used for displaying information output from the network device 200 on the network terminal 100. The request signal generation unit 1022 acquires difference information (hereinafter, "setting value") indicating the difference with respect to the first information that has already been acquired, when continuously requesting first information after acquiring the page information. The logic information is information for performing a prohibition process, when executing the reconstruction of a page, based on a setting value from the network device 200.

When the request signal generation unit 1022 displays the first information of the network device 200, and then continuously requests first information, the request signal generation unit 1022 requests a setting value.

Furthermore, the request signal generation unit 1022 generates a signal (hereinafter, "second request signal") requesting to change the setting of the network device 200, when information requesting to change the setting of the network device 200 is input from the UI 106.

The first request signal and the second request signal generated by the request signal generation unit 1022 are sent to the network device 200 from the LAN 110 or the WLAN 112.

The response signal processing unit 1024 is connected to the display device 104, the LAN 110, and the WLAN 112. The response signal processing unit 1024 performs a process based on a response signal (hereinafter, "first response signal") from the network device 200 in response to a first request signal input by the LAN 110 or the WLAN 112. For example, the response signal processing unit 1024 acquires page information and logic information from the first response signal in response to the first request signal, and constructs a page based on the page information. The response signal processing unit 1024 inputs the constructed page in the display device 104.

The response signal processing unit 1024 acquires a setting value from the first response signal in response to the first request signal, and reconstructs the page, based on the page already being displayed, and the setting value and logic information acquired from the first response signal. The response signal processing unit 1024 inputs the reconstructed page to the display device 104.

Furthermore, the response signal processing unit 1024 acquires information indicating whether the setting has been changed, from the second response signal in response to the second request signal. The response signal processing unit 1024 inputs information indicating whether the setting has been changed, to the display device 104. The user of the network terminal 100 can recognize whether the setting has been changed, by referring to information indicating whether the setting has been changed displayed on the display device 104.

Network Device 200

The network device 200 includes a network board 202, a main board 214, a projection device 218, a UI 220, and an image input terminal 222.

The network board 202 is hardware for executing communication with the network terminal 100 via the network. The network board 202 is referred to as a LAN card, a network adaptor, a network interface card (NIC), etc.

In the network board 202, a communication processor 204 acting as a control unit and a first processor, a storage unit 205, and an image processor 206, are mounted. Furthermore, in the network board 202, a LAN 208 acting as a reception unit, a WLAN 210, and a USB (Universal Serial Bus) 212, are mounted.

The LAN 208 is a LAN card for connecting communication between the network device 200 and the network terminal 100 by a wired line. The LAN 208 transmits/receives information according to a specification of the LAN system.

The WLAN 210 transmits/receives data in a wireless manner, in compliance with a specification of wireless LAN such as IEEE 802.11.

The communication processor 204 is connected to the LAN 208 and the WLAN 210. The communication processor 204 is realized by a CPU. The communication processor 204 has lower power consumption than the image processor 206. The communication processor 204 operates when the network device 200 is in a standby state, and when the network function is used. In other words, the power of the communication processor 204 is on unless the power of the network device 200 itself is off, and the communication processor 204 always operates. The communication processor 204 determines whether the process requested by the first request signal and the second request signal from the network terminal 100 can be executed by the communication processor 204, or can only be executed by the main board 214.

The communication processor 204 executes a process requested by the first request signal or the second request signal, when the communication processor 204 determines that it is possible to execute the process requested by the first request signal or the second request signal from the first request signal or the second request signal.

When the communication processor 204 determines that the process requested by the first request signal or the second request signal from the network terminal 100 can only be executed by the main board 214, the communication processor 204 performs the following process. Specifically, the communication processor 204 inputs the first request signal or the second request signal in the main board 214, when the power of an engine control processor 216 of the main board 214 is on.

On the other hand, when the power of the engine control processor 216 of the main board 214 is off, the communication processor 204 saves the first request signal or the second request signal in the storage unit 205. In this case, the communication processor 204 monitors the state of the engine control processor 216. When the power of the engine control processor 216 is turned on, the communication processor 204 inputs the first request signal or the second request signal to the main board 214.

The storage unit 205 stores various programs and state information of the network device 200. The storage unit 205 mainly stores setting information relevant to the network and connection history, of the network device 200. Furthermore, the storage unit 205 is used when the communication processor 204 executes processes of data.

The USB 212 is a terminal for inputting data according to a serial bus specification from a peripheral device (not illustrated) connected to the network device 200. From a peripheral device connected to the USB 212, information for projecting images, etc., from the network device 200, is input.

The image processor 206 is connected to the communication processor 204 and the USB 212. The image processor 206 is realized by DSP (Digital Signal Processing). The image processor 206 generates data to be projected by the network device 200. For example, the data to be projected is sent from the network terminal 100, and input to the image processor 206, from the LAN 208 or the WLAN 210 via the communication processor 204. The image processor 206 generates an image to be projected, by processing data from the communication processor 204. The image processor 206 inputs the image to be projected, to the main board 214.

Furthermore, image data to be projected is input from a peripheral device via the USB 212. By processing the image data from a peripheral device, the image processor 206 generates an image to be projected. The image processor 206 inputs the image to be projected to the main board 214. The image processor 206 inputs the images to be projected to the main board 214, to execute a so-called slide show, such that a selected series of images are sequentially displayed, The main board 214 is connected to the network board 202. The main board 214 includes a storage unit 215 and the engine control processor 216 acting as a first processor.

The storage unit 215 stores various programs and state information of the network device 200. The storage unit 215 mainly stores setting information relevant to a process of projecting images to the projection device 218 and connection history, of the network device 200. Furthermore, the storage unit 215 is used when the engine control processor 216 processes data.

The engine control processor 216 is connected to the communication processor 204, the image processor 206, the storage unit 215, the projection device 218, the UI 220, and the image input terminal 222.

The engine control processor 216 executes a process requested by the first request signal or the second request signal from the communication processor 204. For example, the engine control processor 216 creates first information requested by the first request signal, and inputs the first information in the communication processor 204. Furthermore, the engine control processor 216 executes the changing of the setting, according to second information requested by the second request signal from the communication processor 204. The engine control processor 216 creates information indicating whether the setting has been changed, and inputs the information to the communication processor 204.

Furthermore, the engine control processor 216 executes control of inputting the data to be projected from the image processor 206 to the projection device 218. Furthermore, the engine control processor 216 executes control of inputting data to be projected from an external device (not illustrated) connected to the image input terminal 222, to the projection device 218.

The projection device 218 is connected to the engine control processor 216. The projection device 218 is a projection type image display device such as a DLP (Digital Light Processing) (registered trademark) projector, which radiates light from a light source to an optical display device such as DVD (Digital Micromirror Device), modulates the radiated light with image signals, and enlarges and projects the image on a screen. As the optical display device, instead of DMD, a projection type image display device using LCD (Liquid Crystal Display device) may be used.

The UI 220 is connected to the engine control processor 216. The UI 220 is an interface for a user operating the network device 200. By operating the UI 220, the user can input data, execute a job, display images, and change settings.

The image input terminal 222 is connected to the engine control processor 216. The image input terminal 222 is a terminal for inputting data to be projected from an external device connected to the image input terminal 222.

Functions of Network Device 200

Figure 3:
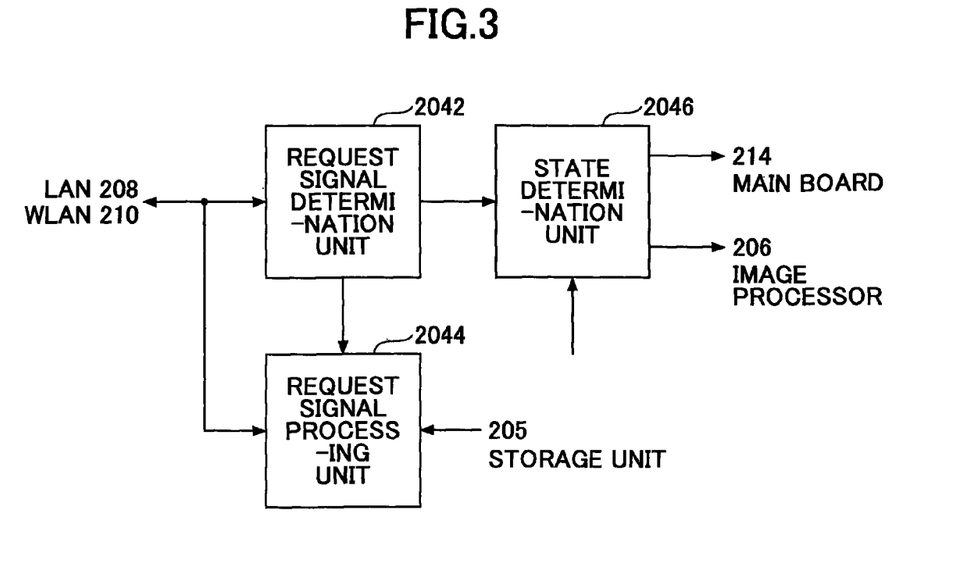
FIG. 3, illustrates an embodiment of a network device.

FIG. 3 illustrates functions of the network device 200.

The functions illustrated in FIG. 3 are mainly executed by the communication processor 204. By operating according to programs (firmware) stored inside the communication processor 204 or programs stored in the storage unit 205, functions of a request signal determination unit 2042, a request signal processing unit 2044, and a state determination unit 2046 are executed.

The request signal determination unit 2042 is connected to the LAN 208 and the WLAN 210. The request signal determination unit 2042 determines whether the process requested by the first request signal or the second request signal sent from the network terminal 100 from the LAN 208 or the WLAN 210, can be executed by the communication processor 204.

For example, when a request (browse request) to browse setting information such as an IP address is made by the first request signal, the request signal determination unit 2042 determines that the process can be executed by the communication processor 204. Furthermore, when a request (browse request) to browse a setting of a slideshow is made by the first request signal, the request signal determination unit 2042 determines that the process can be executed by the communication processor 204. Furthermore, when a request (browse request) to browse the display intervals of a slideshow is made by the first request signal, the request signal determination unit 2042 determines that the process can be executed by the communication processor 204. Furthermore, when a request (browse request) to browse a valid network interface is made by the first request signal, the request signal determination unit 2042 determines that the process can be executed by the communication processor 204.

Furthermore, when a request (change request), to change the setting information of whether to validate or invalidate the setting of executing a slideshow for sequentially displaying images from the USB 212 on the image processor 206, is made by the second request signal, the request signal determination unit 2042 determines that the process can be executed by the communication processor 204. Furthermore, when a request (change request), to change the setting information for setting the display interval of the slideshow, is made by the second request signal, the request signal determination unit 2042 determines that the process can be executed by the communication processor 204. For example, as the setting information of display intervals of the slideshow, 5 seconds through 999 seconds is set. Furthermore, when a request (change request), to change the setting information of setting a valid network interface, is made by the second request signal, the request signal determination unit 2042 determines that the process can be executed by the communication processor 204. For example, as the setting information of setting a valid network interface, wired LAN (LAN 208) or wireless LAN (WLAN 210) is set.

Furthermore, for example, when a request (browse request) to browse setting information such as the image mode is made by the first request signal, the request signal determination unit 2042 determines that the process cannot be executed by the communication processor 204. Furthermore, when a request (browse request) to browse setting information such as the contrast is made by the first request signal, the request signal determination unit 2042 determines that the process cannot be executed by the communication processor 204. Furthermore, when a request (browse request) to browse setting information such as the brightness is made by the first request signal, the request signal determination unit 2042 determines that the process cannot be executed by the communication processor 204.

Furthermore, when a request (change request) to change the setting information such as the image mode is made by the second request signal, the request signal determination unit 2042 determines that the process cannot be executed by the communication processor 204. Furthermore, when a request (change request) to change the setting information such as the contrast is made by the second request signal, the request signal determination unit 2042 determines that the process cannot be executed by the communication processor 204. Furthermore, when a request (change request) to change the setting information such as the brightness is made by the second request signal, the request signal determination unit 2042 determines that the process cannot be executed by the communication processor 204.

When the request signal determination unit 2042 determines that the process requested by the first request signal and the second request signal can be executed by the communication processor 204, the request signal determination unit 2042 inputs the first request signal and the second request signal to the request signal processing unit 2044. Meanwhile, when the request signal determination unit 2042 determines that the process requested by the first request signal and the second request signal cannot be executed by the communication processor 204, the request signal determination unit 2042 inputs the first request signal and the second request signal to the state determination unit 2046.

The request signal processing unit 2044 is connected to the LAN 208, the WLAN 210, and the request signal determination unit 2042. The request signal processing unit 2044 executes a process requested by the first request signal and the second request signal input from the request signal determination unit 2042. When a first request signal is input from the request signal determination unit 2042, the request signal processing unit 2044 acquires corresponding information from the state information of the network device 200 stored in the network device 200. When a second request signal is input from the request signal determination unit 2042, the request signal processing unit 2044 changes the corresponding setting information, and changes the corresponding setting information of the state information of the network device 200 stored in the storage unit 205.

First Information

Figure 4:
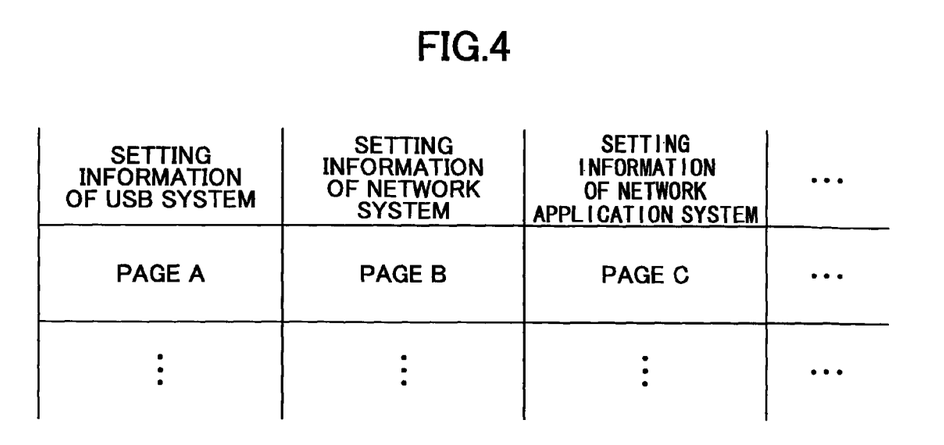
FIG. 4 illustrates an example of first information.

FIG. 4 illustrates an example of state information stored in the storage unit 205. FIG. 4 mainly illustrates setting information.

The setting information is setting information of a USB system, setting information of a network system, and setting information of a network application system. Setting information other than the above may be stored in the storage unit 205.

The setting information of a USB system is information relevant to the setting of the name of the USB device, information relevant to the connection of the USB device, information relevant to the setting of the slideshow, and information relevant to display intervals of the slideshow. The setting information of a network system is information relevant to the setting of an IP address, information relevant to a valid network interface, and information relevant to connection to a network. The setting information of a network application system is information relevant to the environment setting of a network application.

Each setting information item is associated with a page in the information output from the network device 200. In the example of FIG. 4, the setting information of the USB system and page A are associated with each other. That is to say, in page A, it is possible to browse the setting information of the USB system, and change the setting information of the USB system. Furthermore, the setting information of the network system and page B are associated with each other. That is to say, in page B, it is possible to browse the setting information of the network system, and change the setting information of the network system. Furthermore, the setting information of the network application system and page C are associated with each other. That is to say, in page C, it is possible to browse the setting information of the network application system, and change the setting information of the network application system.

Furthermore, each page is associated with logic information. Logic information is information used for performing a prohibition process, when reconstructing the page based on a setting value from the network device 200. For example, the logic information is information indicating whether the combinations of the respective setting information items are allowed, and information indicating the allowed number of characters.

Figure 5:
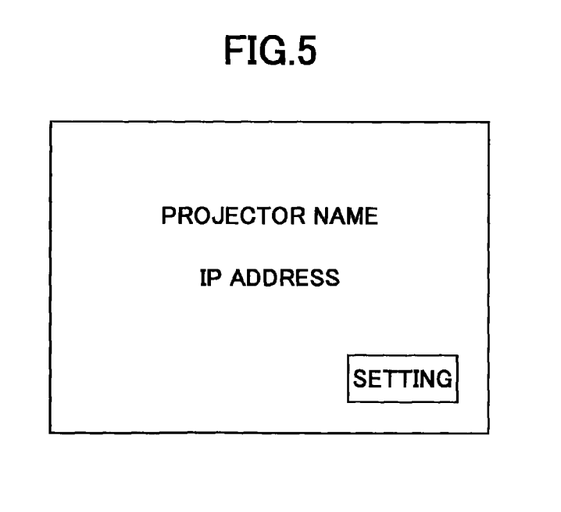
FIG. 5 illustrates an example of a page.

FIG. 5 illustrates an example of page B. In the example of page B, a projector name, an IP address and an icon displaying "setting" are displayed. The user of the network terminal 100 can view the setting information of the network system and change the setting information of the network system by operating the UI 106 and selecting the icon displaying "setting". It is possible to set whether to perform either one of browsing the setting information of the network system or changing the setting information of the network system, in a page that is displayed after selecting the icon displaying "setting".

When the first request signal from the request signal determination unit 2042 is for requesting the first information for the first time, the request signal processing unit 2044 acquires page information and logic information, and sends out this information from the LAN 208 or the WLAN 210. When the first request signal from the request signal determination unit 2042 is for continuously requesting the first information after acquiring the page, the request signal processing unit 2044 acquires difference information between the page information already acquired and the current page information, and sends out this information from the LAN 208 or the WLAN 210.

The state determination unit 2046 is connected to the request signal determination unit 2042. When a first request signal and a second request signal are input from the request signal determination unit 2042, the state determination unit 2046 determines whether the power of the engine control processor 216 of the main board 214 is on or off.

When the state determination unit 2046 determines that the power of the engine control processor 216 is on, the state determination unit 2046 inputs a first request signal and a second request signal in the engine control processor 216.

When the state determination unit 2046 determines that the power of the engine control processor 216 is off, the state determination unit 2046 temporarily stores the first request signal and the second request signal in the storage unit 205. When the state determination unit 2046 has stored the first request signal and the second request signal in the storage unit 205, the state determination unit 2046 periodically monitors whether the power of the engine control processor 216 has been turned on. When the state determination unit 2046 detects that the power of the engine control processor 216 has been turned on, the state determination unit 2046 acquires the first request signal and the second request signal from the storage unit 205, and inputs the first request signal and the second request signal to the engine control processor 216.

State of Network Device 200

Figure 6:
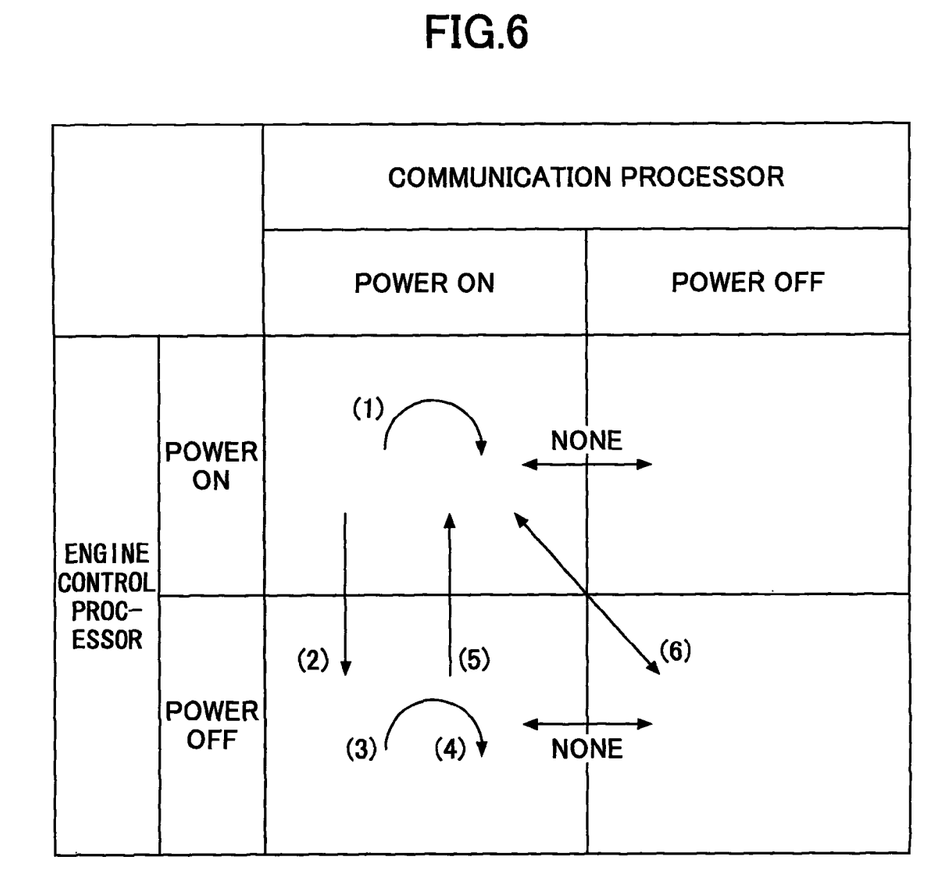
FIG. 6 illustrates the state of the network device.

FIG. 6 illustrates the state of the network device 200. FIG. 6 illustrates combinations of the on state or the off state of the power of the communication processor 204 of the network device 200, and the on state or the off state of the power of the engine control processor 216 of the network device 200. According to FIG. 6, in the network device 200, it is not possible to have a combination where the power of the communication processor 204 is in an off state and the power of the engine control processor 216 is in an on state. That is to say, the power of the communication processor 204 becomes an on state, when the power of the engine control processor 216 is in an off state; this corresponds to a case where the power of the network device 200 itself is in an off state.

In the following, with reference to FIG. 6, a description is given of operations in states expressed by the values in FIG. 6.

In Case of (1)

To the communication processor 204, a first request signal and a second request signal are input from the network terminal 100 via the LAN 208 and the WLAN 210.

The communication processor 204 determines whether the process requested by the first request signal and the process requested by the second request signal from the network terminal 100 can be executed by the communication processor 204.

When a request to browse the setting of a slideshow is made by the first request signal, when a request to browse the display intervals of the slideshow is made by the first request signal, and when a request to browse a valid network interface is made by the first request signal, the communication processor 204 determines that the request can be executed at the communication processor 204.

Furthermore, when a request to browse the setting information such as an image mode is made by the first request signal, when a request to browse the setting information, such as the contrast is made by the first request signal, and when a request to browse the setting information such as the brightness is made by the first request signal, the communication processor 204 determines that the request cannot be executed at the communication processor 204.

When a request to validate or invalidate the setting of executing a slideshow for sequentially displaying images from the USB 212 on the image processor 206 is made by the second request signal, when a request to change the setting information for setting the display interval of the slideshow is made by the second request signal, and when a request to change the setting information for setting a valid network interface is made by the second request signal, the communication processor 204 determines that the request can be executed at the communication processor 204.

Furthermore, when a request to change the setting information such as an image mode is made by the second request signal, when a request to change the setting information such as the contrast is made by the second request signal, and when a request to change the setting information such as the brightness is made by the second request signal, the communication processor 204 determines that the request cannot be executed at the communication processor 204.

When the communication processor 204 determines that the process requested by the first request signal and the process requested by the second request signal cannot be executed by the communication processor 204, the communication processor 204 inputs the first request signal and the second request signal in the engine control processor 216.

The engine control processor 216 determines whether the process requested by the first request signal can be executed. When the engine control processor 216 determines that the process requested by the first request signal can be executed, the engine control processor 216 acquires first information requested by the first request signal from the storage unit 215, and inputs the first information to the communication processor 204. The communication processor 204 sends the first information from the engine control processor 216 to the network terminal 100, via the LAN 208 and the WLAN 210.

Furthermore, the engine control processor 216 determines whether the process requested by the second request signal can be executed. When the engine control processor 216 determines that the process requested by the second request signal can be executed, the engine control processor 216 changes the setting by applying the second information requested by the second request signal, to the storage unit 215.

The engine control processor 216 inputs, to the communication processor 204, information indicating whether the process requested by the second request signal has been completed. The communication processor 204 sends, to the network terminal 100 via the LAN 208 and the WLAN 210, information indicating whether the process requested by the second request signal has been completed received from the engine control processor 216.

In Cases of (2), (3)

To the communication processor 204, the first request signal and the second request signal are input from the network terminal 100, via the LAN 208 and the WLAN 210.

The communication processor 204 determines whether the process requested by the first request signal and the second request signal from the network terminal 100 can be executed by the communication processor 204.

When the communication processor 204 determines that the process requested by the first request signal and the second request signal, cannot be executed by the communication processor 204, the communication processor 204 determines whether the power of the engine control processor 216 is in an on state or an off state.

When the communication processor 204 determines that the power of the engine control processor 216 is in an off state, the communication processor 204 sends, to the network terminal 100 via the LAN 208 and the WLAN 210, information indicating that the process requested by the first request signal and the second request signal from the network terminal 100 cannot be processed. That is to say, the network device 200 reports to the network terminal 100 that the process requested by the first request signal and the second request signal cannot be processed.

In Cases of (4), (5), (6)

To the communication processor 204, the first request signal and the second request signal are input from the network terminal 100, via the LAN 208 and the WLAN 210.

The communication processor 204 determines whether the process requested by the first request signal and the process requested by the second request signal from the network terminal 100 can be executed by the communication processor 204.

When the communication processor 204 determines that the process requested by the first request signal and the second request signal cannot be executed by the communication processor 204, the communication processor 204 determines whether the power of the engine control processor 216 is in an on state or an off state.

When the communication processor 204 determines that the power of the engine control processor 216 is in an off state, the communication processor 204 saves the first request signal and the second request signal from the network terminal 100, in the storage unit 205.

The communication processor 204 monitors the state of the engine control processor 216. When the power of the engine control processor 216 is determined to be in an on state, the communication processor 204 inputs the first request signal or the second request signal to the engine control processor 216.

The engine control processor 216 determines whether the process requested by the first request signal can be executed. When the engine control processor 216 determines that the process requested by the first request signal can be executed, the engine control processor 216 acquires first information requested by the first request signal from the storage unit 215, and inputs the first information to the communication processor 204. The communication processor 204 sends the first information from the engine control processor 216 to the network terminal 100, via the LAN 208 and the WLAN 210.

Furthermore, the engine control processor 216 determines whether the process requested by the second request signal can be executed. When the engine control processor 216 determines that the process requested by the second request signal can be executed, the engine control processor 216 changes the setting information requested by the second request signal, and applies the second information to the storage unit 215. The engine control processor 216 inputs, to the communication processor 204, information indicating whether the process requested by the second request signal has been completed. The communication processor 204 sends, to the network terminal 100 via the LAN 208 and the WLAN 210, information indicating whether the process requested by the second request signal has been completed received from the engine control processor 216.

Operations of Device Monitor System

Figure 7:
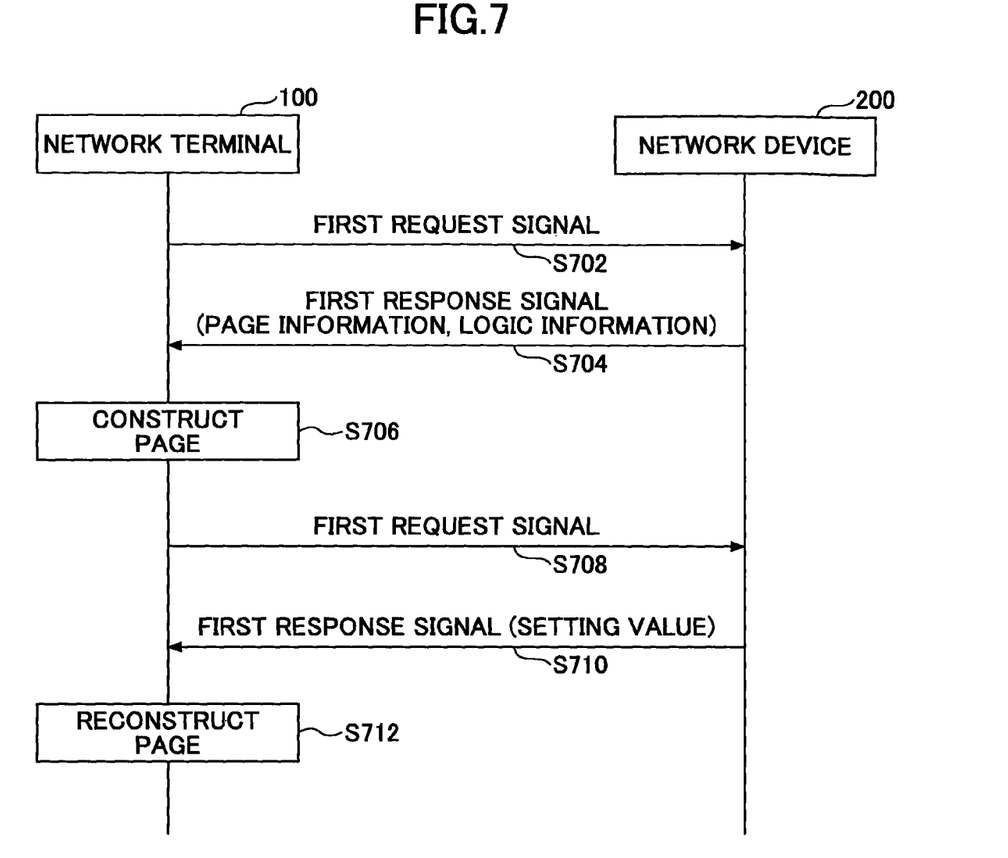
FIG. 7 is a sequence chart indicating an embodiment of operations of the communication system (part 1)

FIG. 7 is a sequence chart indicating an embodiment of operations of the device monitor system (part 1). FIG. 7 mainly indicates a process executed by the network device 200 according to a first request signal from the network terminal 100.

In step S702, the network terminal 100 sends a first request signal to the network device 200.

In step S704, the network device 200 sends a first response signal to the network terminal 100. To the first response signal, page information and logic information are appended.

In step S706, the network terminal 100 constructs a page based on the first response signal from the network device 200.

In step S708, the network terminal 100 continuously sends a first request signal to the network device 200.

In step S710, the network device 200 sends the first response signal to the network terminal 100. To the first response signal, a setting value is appended.

In step S712, the network terminal 100 reconstructs the page based on the page already displayed, logic information, and a setting value from the network device 200, and displays the page. The network terminal 100 reconstructs the page by performing a process based on logic information such as a prohibition process when applying the setting value to the page already displayed.

Figure 8:
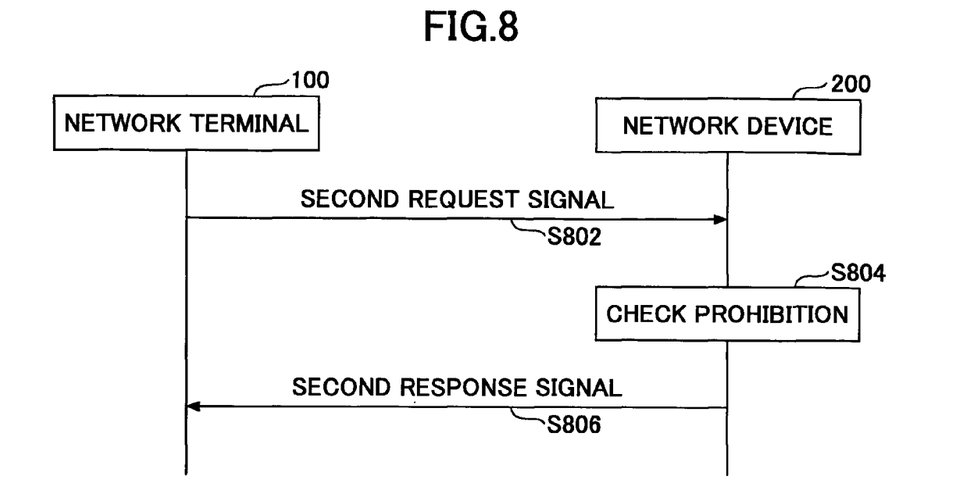
FIG. 8 is a sequence chart indicating an embodiment of operations of the communication system (part 2)

FIG. 8 is a sequence chart indicating an embodiment of operations of the device monitor system (part 2). FIG. 8 mainly indicates a process executed by the network device 200 according to a second request signal from the network terminal 100.

In step S802, the network terminal 100 sends a second request signal to the network device 200.

In step S804, the network device 200 checks the prohibition of second information requested by the second request signal from the network terminal 100, to determine whether the setting can be changed. When the setting can be changed, the network device 200 executes the changing of the setting.

In step S806, the network device 200 sends, to the network terminal 100, a second response signal to which information indicating whether the changing of the setting has been executed is appended.

Effects of Embodiment of Device Monitor System

Figure 9:
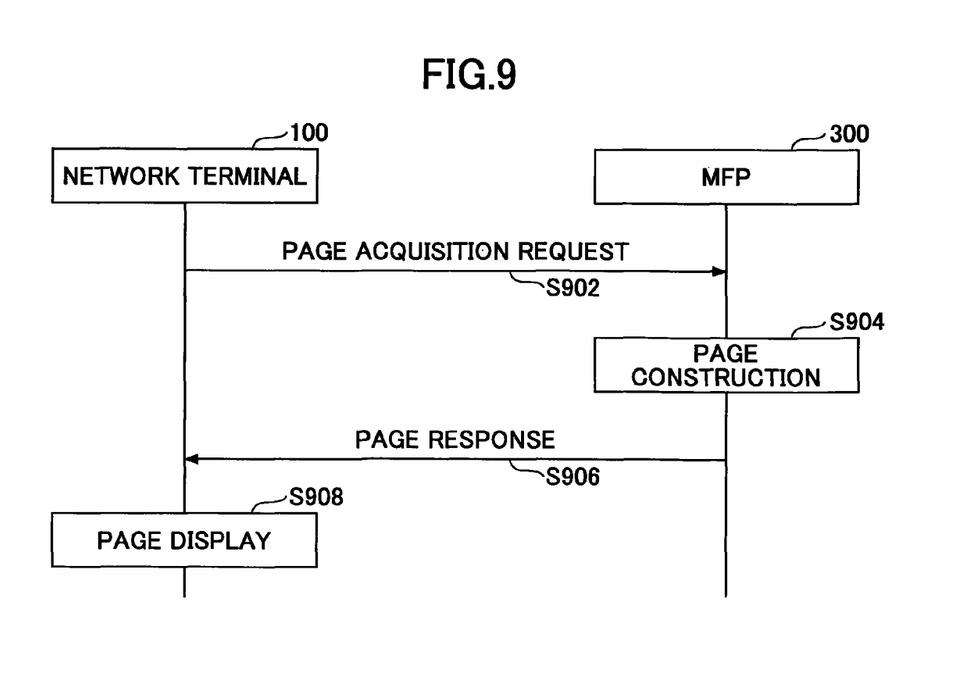
FIG. 9 is a sequence chart indicating an example of a process of acquiring a page performed by a conventional network terminal.

FIG. 9 illustrates an example of a process of acquiring a page performed by a conventional network terminal 100. In the example of FIG. 9, the network terminal 100 acquires page information from the MFP 300.

In step S902, the network terminal 100 sends a page acquisition request to a MFP 300.

In step S904, the MFP 300 constructs a page requested by the network terminal 100.

In step S906, the MFP 300 sends a page response to which the page constructed in step S904 is appended.

In step S908, the network terminal 100 displays the page received from the MFP 300.

In the sequence chart indicated in FIG. 9, the page is constructed at the output device side such as the MFP 300, and the page is sent to the network terminal 100. In a case where the page is constructed at the output device side and sent from the output device side, there may be a problem in that the processing load is too high when a communication processor of low power consumption is used.

In an embodiment of the device monitor system, the output device side sends page information and logic information in response to the first request signal from the network device. The network device constructs a page based on the page information and logic information from the output device. By constructing the page at the network device side, it is possible to reduce the processing load on the output device side, and therefore the communication processor can perform the process. Because the communication processor can perform the process, even when the power of the image processor and the engine control process is off, the process can be performed. Therefore, the power consumption of the network device can be reduced.

According to an embodiment of the device monitor system, the network device includes a communication processor for executing a process relevant to network communication, and an engine control processor for executing a process relevant to an output process. The communication processor is constantly in an on state and the power of the engine control processor may be turned on or off. As the power of the communication processor and the power of the engine control processor may be separately turned on or off, even when the power of the engine control processor is in an off state, the communication processor can be used for browsing the setting information of the network device and state information such as job history, and for changing the setting information.

Furthermore, the network device includes an image processor for generating data to be projected. For example, the image processor processes data to be projected, which is input from a peripheral device via USB. The power of the image processor may be turned on or off. As the power of the communication processor and the power of the image processor may be separately turned on or off, even when the power of the image processor is in an off state, the communication processor can be used for browsing the setting information of USB and state information, and for changing the setting information.

The embodiment of the device monitor system may be applied to a communication system for performing communication between an output device such as an electronic whiteboard and a remote conference system, and a network terminal.

Furthermore, the embodiment of the device monitor system may be applied to a device provided with a communication function. Accordingly, the power of the device can be controlled.

Figure 10:
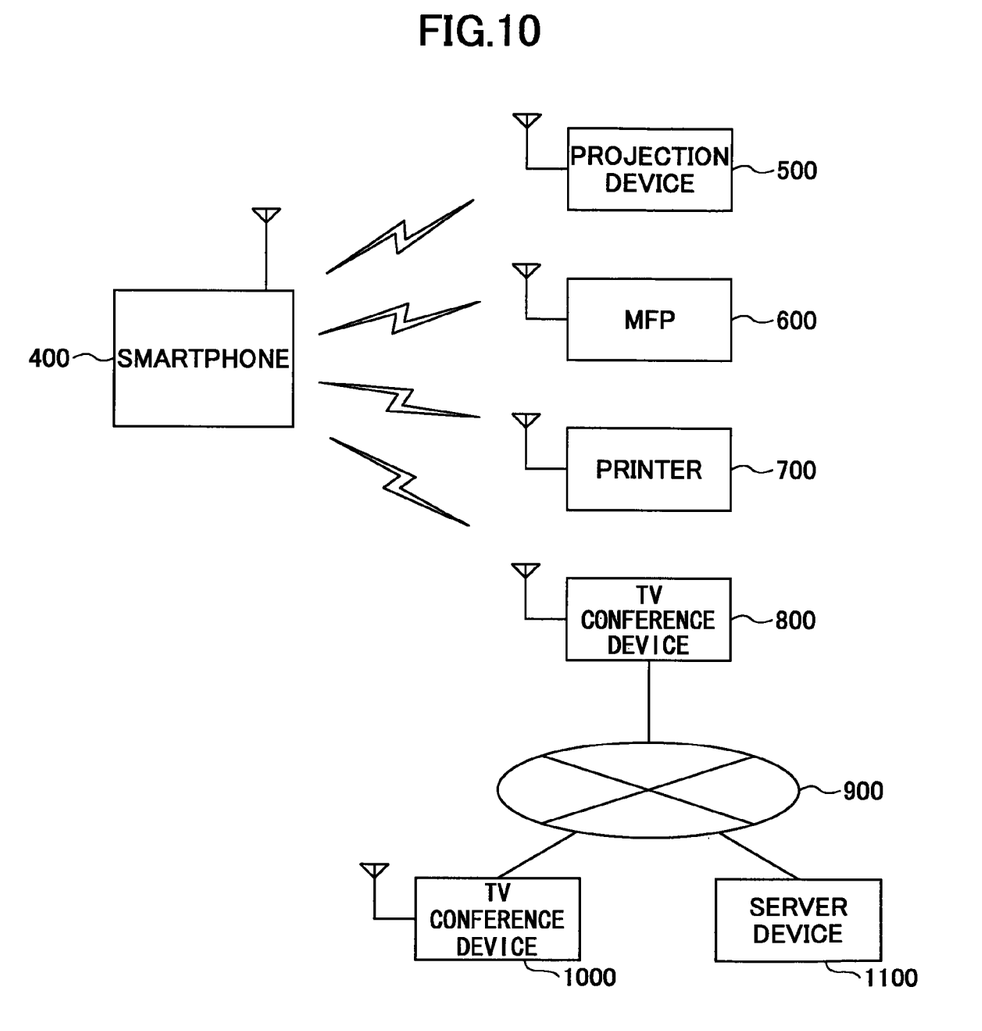
FIG. 10 illustrates an application example of the communication system.

FIG. 10 illustrates an application example of the device monitor system. In the example illustrated in FIG. 10, a smart device such as a smartphone 400 and devices such as a projection device (projector) 500, a multifunction peripheral device (MFP) 600, a printer 700, and a TV conference device 800; are connected to each other in a wireless manner. For example, as the smart device, the above-described network terminal 100 may be applied, and as the projection device (projector) 500, the multifunction peripheral device (MFP) 600, the printer 700, and the TV conference device 800, the above-described network device 200 may be applied.

Furthermore, the TV conference device 800 is connected to a network 900 such as the Internet, and to the network 900, a TV conference device 1000 and a server device 1100 are connected. As the TV conference device 800 and the TV conference device 1000, for example, a general-purpose information processing device such as a PC (Personal Computer), a tablet terminal, and a smartphone, and an exclusive-use terminal for a TV conference system, may be applied. For example, the server device 1100 implements control of the TV conference, such as monitoring the connection state as to whether the TV conference device 800 and the TV conference device 1000 are connected, performing connection control at the start or the end of the TV conference, and transmitting/receiving data such as images and sound during the TV conference. FIG. 10 illustrates two TV conference devices; however, the present embodiment is also applicable to three or more TV conference devices.

The present invention is described with reference to specific embodiments and modifications; however, the embodiments and modifications are merely examples, and those skilled in the art may understand various variations, corrections, substitutions, replacements, and modifications. As a matter of convenience, devices of the embodiments of the present invention are described by using functional block diagrams; however, the devices may be realized by hardware, by software, or by a combination of hardware and software. The communication device and communication system are not limited to the specific embodiments described herein, and variations, corrections, substitutions, replacements, and modifications may be made without departing from the scope of the present invention.

According to an aspect of the present invention, it is possible to reduce the power consumption when using the network function in a standby state.

The present application is based on and claims the benefit of priority of Japanese Priority Patent Application No. 2013-161342, filed on Aug. 2, 2013 and Japanese Priority Patent Application No. 2014-149590, filed on Jul. 23, 2014, the entire contents of which are hereby incorporated herein by reference.

The invention claimed is:

1. A communication device comprising:
   a memory to store state information relevant to a state of the communication device;
   a first processor configured to perform a process on the information received from an external device; and
   a second processor configured to perform a process of executing output,
   wherein:
   when the information received from the external device is a browse request to browse the state information, the first processor acquires requested information from the state information stored in the memory, and executes control to send the acquired information to the external device,
   the first processor determines whether a process requested by a request signal from the external device can be executed by the first processor or by the second processor, and
   when the first processor determines that the process requested by the request signal can be executed by the second processor, and a power of the second processor is off, the first processor reports to the external device that the process requested by the request signal cannot be executed.

2. The communication device according to claim 1, wherein
   the memory is configured to store, setting information set by the first processor, and
   when the information received from the external device is a change request to change the setting information set by the first processor, the first processor executes changing of the setting information set by the first processor stored in the memory.

3. The communication device according to claim 1, wherein
   when the first processor determines that the process requested by the request signal can be executed by the second processor, and a power of the second processor is off, the first processor stores the request signal in the memory.

4. The communication device according to claim 3, wherein
   the first processor monitors whether the power of the second processor is turned on, and
   when the power of the second processor is turned on, the first processor inputs, in the second processor, the request signal stored in the memory.

5. A system comprising:
   an external device; and
   a communication device, wherein
   the external device sends information including a browse request to browse state information of the communication device, and
   the communication device includes
      a memory to store state information relevant to a state of the communication device;
      a first processor configured to perform a process on the information received from the external device; and
      a second processor configured to perform a process of executing output,
   wherein:
   when the information received from the external device is the browse request to browse the state information, the first processor acquires requested information from the state information stored in the memory, and executes control to send the acquired information to the external device,
   the first processor determines whether a process requested by a request signal from the external device can be executed by the first processor or by the second processor, and
   when the first processor determines that the process requested by the request signal can be executed by the second processor, and a power of the second processor is off, the first processor reports to the external device that the process requested by the request signal cannot be executed.

6. The system according to claim 5, wherein
   the external device sends a change request to change setting information set by the first processor, and
   when the information received from the external device is the change request to change the setting information set by the first processor, the first processor executes changing of the setting information set by the first processor stored in the memory.

7. A non-transitory computer-readable recording medium storing a program that causes a computer to execute a process performed by a communication device including a memory to store state information relevant to a state of the communication device, a first processor for processing information received from an external device, and a second processor for executing output, the process comprising:
   receiving the information from the external device; and
   executing control by the first processor, to acquire requested information requested by the external device, from state information stored in the memory storing the state information relevant to a state of the communication device, and to send the acquired information to the external device, when the information received from the external device is a browse request to browse the state information,
   wherein:
   the first processor determines whether a process requested by a request signal from the external device can be executed by the first processor or by the second processor, and
   when the first processor determines that the process requested by the request signal can be executed by the second processor, and a power of the second processor is off, the first processor reports to the external device that the process requested by the request signal cannot be executed.

\* \* \* \* \*